Nov. 2, 1937.  E. E. WILLIAMS  2,098,120
STABILIZER FOR MOTOR VEHICLES
Filed Aug. 1, 1936  2 Sheets-Sheet 2
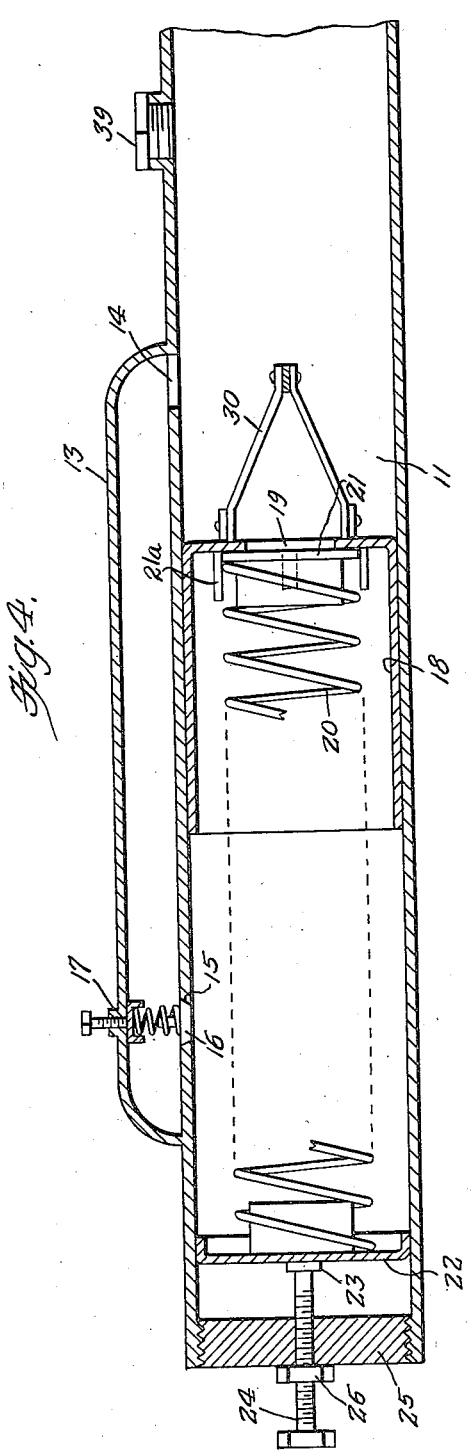
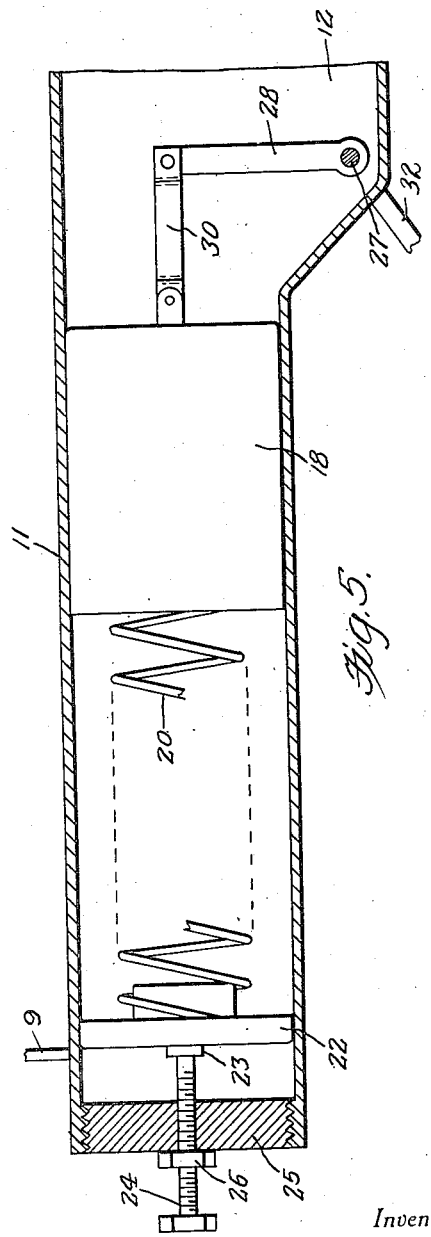
Inventor
*Elmer E. Williams,*
By *Clarence A. O'Brien*
*Hyman Berman*
Attorneys Patented Nov. 2, 1937

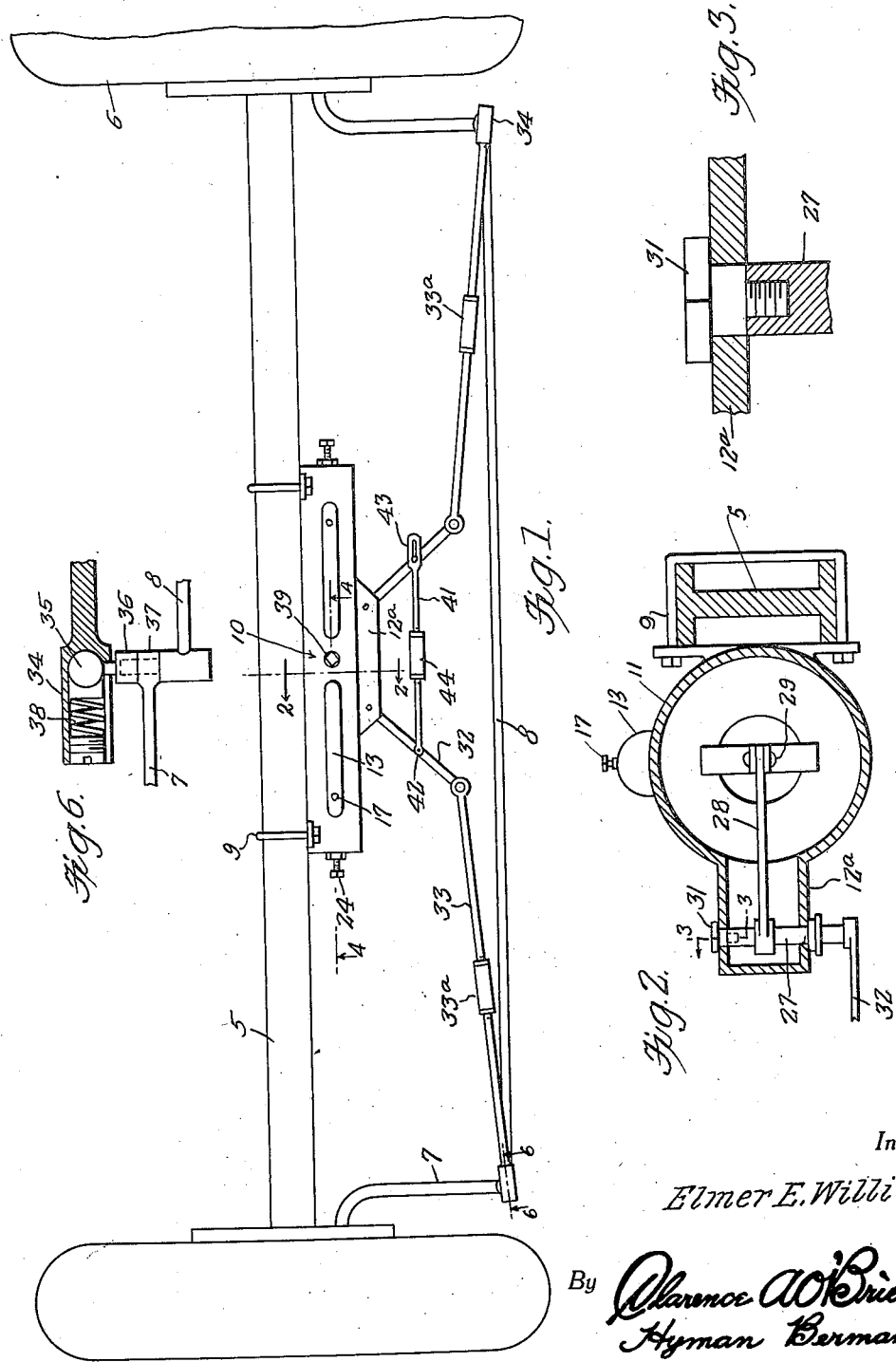

2,098,120

UNITED STATES PATENT OFFICE 2,098,120

STABILIZER FOR MOTOR VEHICLES

Elmer E. Williams, Hull, Tex., assignor of thirty-three and one-third per cent to C. A. Pedigo, Hull, Tex.

Application August 1, 1936, Serial No. 93,893

2 Claims. (Cl. 280—90)

This invention relates to means for minimizing jarring of the steering system and wheel wobble in motor vehicles, and an object of the invention is, in general, to improve upon stabilizing devices as now used on automobiles for this purpose.

The invention together with its objects and advantages will be best understood from a study of the following description taken in connection with the accompanying drawings wherein:—

Figure 1 is a plan view illustrating the application of the invention.

Figure 2 is a sectional view taken substantially on the line 2—2 of Figure 1.

Figure 3 is a detail sectional view taken substantially on the line 3—3 of Figure 2.

Figure 4 is an enlarged sectional view through one end of a casting embodying the features of the present invention, and taken substantially on the line 4—4 of Figure 1.

Figure 5 is a horizontal longitudinal sectional view through said end of the casting with the piston in plan.

Figure 6 is a fragmentary detail view partly in section and partly in elevation illustrating the connection between a spindle arm and a link, and taken substantially on the line 6—6 of Figure 1.

Referring to the drawings by reference numerals it will be seen that 5 indicates generally the axle of an automobile while 6 indicates the front or steering wheels thereof and 7 indicates spindle arms. The rod connecting the spindle arms 7 is indicated by the reference numeral 8.

In accordance with the present invention there is secured on the rear side of the axle 5 through the medium of U bolts or in any other suitable manner and as indicated generally at 9 a casting 10 formed to provide a pair of cylinders 11 integral with and extending in reverse directions from an intermediate chamber 12.

Each cylinder 11 is provided with a by-path 13 connected through the medium of a port 14 with its cylinder 11 adjacent one end of the cylinder, and through the medium of a port 15 with the respective opposite end of the cylinder, or in other words farthest remote from the chamber 12. Controlling the port 15 is a by-path valve 16 for which there is provided a suitable spring tension device 17 that serves to normally and yieldingly hold the valve 16 seated for closing the port 15.

Having a working fit in each cylinder 11 is a hollow piston 18 that is completely open at one end and at its respective opposite end is provided with an opening 19. The piston 18 is normally urged in one direction through the medium of a coil spring 20 one end of which is received within the cylinder 11 and is suitably engaged with a disk valve 21 provided for normally closing the port 19 of the piston. Suitable guide means 21a is provided for each valve 21 to confine the latter to axial shifting movement within the piston.

At its respective opposite end the spring 20 is suitably engaged with an adjusting disk 22 having a working fit within the cylinder 11 and with which is swively or otherwise suitably connected as at 23 an adjusting screw 24 that is threaded through a plug 25 provided in the free end of the cylinder 11 as shown in Figure 4. Screw 24 is provided with a suitable lock nut 26 and it will be obvious that through the medium of the screw 24 disk 22 may be shifted axially of the cylinder as found desirable for increasing or diminishing the tension of the spring 20.

The chamber 12 is laterally extended as at 12a and journaled in the extension 12a of the chamber are vertical shafts 27 provided with arms 28 that are pivoted at their respective free ends as at 29 to the ends of pairs of arms 30 pivotally connected with the apertured ends of the pistons 18.

The shafts 27 at one end are provided with threaded sockets for receiving threaded ends of bolts 31 that have smooth shank portions journaled in suitable openings provided in the top wall of the chamber extension 12a as will be clear from a study of Figures 2 and 3.

Each shaft 27 is provided on its lower end with an arm 32 that is pivotally connected with one end of a link 33 the other end of which link is provided, as shown in Figure 6, with a socket 34 that receives a ball 35 provided as an integral part of a nut 36. The nut 36 is substituted for the usual nut that is engaged with the coupling pin 37 used in connecting a spindle arm 7 with the connecting rod 8. (See Figure 6.)

The socket 34 is provided with a suitable spring device 38 for yieldably seating the ball 35 within the socket 34.

Each of the links 33 is longitudinally extensible having as a part thereof a turn buckle assembly indicated generally by the reference numeral 33a.

For the chamber 12 there is provided a suitable filling opening for which is provided a plug 39.

It will be understood that in actual practice liquid to the desired amount is placed within the casting 10, the chamber 12 serving as a reservoir for the liquid or fluid. It will thus be seen that when the steering mechanism is operated and the wheels 6 are turned to the required angle through the steering assembly or apparatus one of the pistons 18 will be caused to move in one direction and the other of the pistons 18 caused to move in a reverse direction. Thus it will be seen that, as one piston moves toward the free end of its cylinder the other piston will move in a reverse direction or towards the end of its cylinder connected with the chamber 12. Obviously, as, for example, the piston 18, shown in Figure 4, moves towards the left in Figure 4, valve 21 closes and the fluid trapped between the piston 18 and the disk 22 will be forced through the by-path 13, valve 16 opening in response to the pressure of the fluid. The fluid thus passing into the by-path 13 flows through the by-path to return to the cylinder 11 at the opposite end of the piston 18 through the ports 14. Obviously, on the return stroke of the piston valve 21 will be unseated to permit the fluid to flow through the port 19 to become trapped between the piston 18 and its disk 22 for repeating the cycle of operation just described.

From the above it will be seen that with this device the driver of the automobile may turn the wheels to any desired position without a great deal of effort on the part of the driver while at the same time the device will insure a proper "toe-in" of the wheel at both low and high speed and will serve to provide a substantially absolute safety device at all times.

Arms 32 are connected by an extensible rod 41, having a turnbuckle 44 incorporated therein; one end of rod 41 being pivoted to one arm 32 as at 42, and the other end of rod 41 having a lost-motion connection 43 with the other arm 32.

It is thought that a clear understanding of the construction, utility and advantages of an invention of this character will be had without a more detailed description.

Having thus described the invention what is claimed as new is:—

1. A stabilizer comprising a chamber having cylinders projecting from its respective opposite ends, each of said cylinders being provided with an external by-path and ports connecting the respective opposite ends of the by-path with its cylinder adjacent the respective opposite ends of the cylinder, a piston having a sliding fit in each cylinder, said piston having an opening therethrough, a valve controlling said opening, a spring tension device connected with the valve for yieldably seating the valve, a by-path valve associated with the port connecting one end of the by-path with its cylinder, a pair of vertical shafts journaled in said chamber, there being one shaft for each piston, each of said shafts being provided with an arm, and said piston having arms extending therefrom and pivoted at one end to the shaft arm.

2. In an automobile stabilizer, the combination with the spindle arms, of a pair of intercommunicating cylinders, pistons having working fits in said cylinders, vertical shafts journaled intermediate the adjacent ends of the cylinders, operating connections between the shafts and the pistons, and operating connections between the shafts and the spindle arms, each of said cylinders being provided with a by-path, ports connecting each by-path with its cylinder, valve means controlling one of the said ports of each by-path, and each piston having a passage therethrough, a valve controlling said passage, and a spring tension device connected with the last mentioned valve.

ELMER E. WILLIAMS.